United States Patent

Hilbert

[15] 3,652,950

[45] Mar. 28, 1972

[54] SIGNAL RECONSTRUCTION CIRCUIT

[72] Inventor: Francis H. Hilbert, River Grove, Ill.

[73] Assignee: Motorola, Inc., Franklin Park, Ill.

[22] Filed: Mar. 9, 1970

[21] Appl. No.: 17,436

[52] U.S. Cl. ..............................330/30 D, 307/268, 330/69

[51] Int. Cl. ........................................H03f 3/68, H03k 5/00

[58] Field of Search..........................307/235, 268; 328/117; 330/30 D, 69

[56] References Cited

UNITED STATES PATENTS

| | | | |
|---|---|---|---|
| 3,130,371 | 4/1964 | Copeland | 328/117 X |
| 3,465,169 | 9/1969 | Foerster | 307/235 |

*Primary Examiner*—Roy Lake

*Assistant Examiner*—Lawrence J. Dahl

*Attorney*—Mueller & Aichele

[57] ABSTRACT

A signal reconstruction circuit for rectangular-wave signal trains is provided in the form of a differential amplifier switching circuit, with an input signal being applied directly to one of the two inputs of the differential amplifier and being applied to a peak detector which establishes a reference voltage. A portion of the reference voltage is applied to the other input of the differential amplifier, thereby varying the switching level of the differential amplifier in accordance with the input signal strength; so that the reconstructed wave form is relatively independent of input signal strength variations.

7 Claims, 2 Drawing Figures

PATENTED MAR 28 1972 3,652,950

Inventor
FRANCIS H. HILBERT
BY
Mueller, Aichele & Rauner
ATTYS.

SIGNAL RECONSTRUCTION CIRCUIT

BACKGROUND OF THE INVENTION

In the transmission of rectangular-wave signals for conveying binary data, pulse-width modulated information, time-division multiplexed digital information, and the like, a two-level or binary signal with sharp rectangular-wave pulse transitions between the levels is employed as the original waveform. When this type of signal is transmitted, the sharp transitions between the levels undergo a substantial distortion; so that before the waveform can be utilized at the receiver, it is necessary that it be reconstructed. In addition, complex analog and multilevel signals often require reconstruction into square waves or rectangular pulses as a function of a ratio of peak levels to a reconstruction level.

Generally, such reconstruction is done by a threshold switching circuit such as a Schmitt trigger or the like; so that when the input signal is below a predetermined threshold, one output is obtained from the switching circuit, and when the input signal rises above the threshold, a second output is obtained from the switching circuit. The transitions between these two outputs have a substantially steeper slope than the slope of the input signal, so that a rectangular-wave signal waveform is reconstructed.

A disadvantage in these trigger circuits, however, is that generally hysterisis exists; so that the threshold level for rising signals is different from the threshold level in the opposite direction for falling signals. As a result, the reconstructed waveform is not a true image of the desired reconstruction. In addition, the slope of the input signal is affected by the switching time of the trigger circuit itself.

Another disadvantage of threshold detecting circuits is that with variations in the input signal strength, the duty cycle of the reconstructed signal also varies. Thus, for input signals undergoing a fair amount of amplitude modulation, the reconstructed signal is highly distorted since the slicing level of the threshold detector is fixed.

SUMMARY OF THE INVENTION

Accordingly, it is an object of this invention to provide an improved signal construction circuit.

It is an additional object of this invention to construct a rectangular-wave from an input signal with a circuit which is relatively insensitive to amplitude modulation of the input signal waveform.

In accordance with a preferred embodiment of this invention a signal construction circuit employs a differential amplifier circuit having first and second inputs, with an input signal being applied to the first input of the differential amplifier. The input signal also is applied to a signal level detector which produces a reference voltage, a portion of which is coupled to the other input of the differential amplifier to establish its switching level; so that amplitude modulation of the input signal results in a varying reference voltage established by the signal level detection circuit. As a result, variations of the strength of the input signal have substantially no affect on the output signal produced by the differential amplifier circuit.

DETAILED DESCRIPTION

Figures 1, 2:
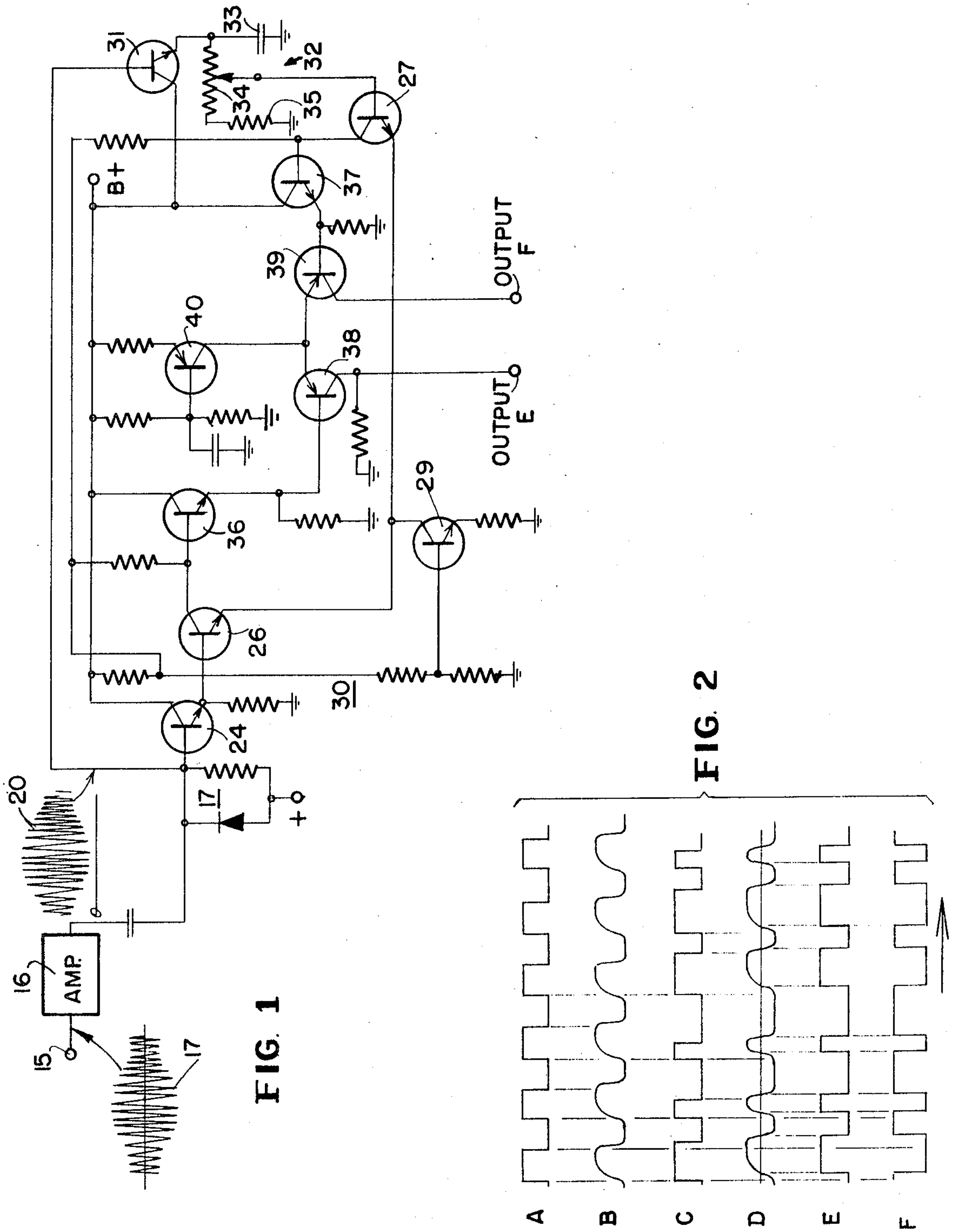
FIG. 1 is a schematic diagram of a preferred embodiment of this invention.
FIG. 2 illustrates waveforms useful in explaining the operation of the circuit shown in FIG. 1.

A number of systems exist for the transmission of square wave signals which represent binary encoded data, or analog information encoded in the form of pulse-width modulated square wave signals, or time-division multiplexed transmission signal systems, and the like. All of these signals are in the form of a substantially two-level or multilevel signal having a very abrupt or sharp pulse transitions between the levels. Generally, signals of this type are formed by binary switching circuits and may be considered as "on" and "off" signals.

When a signal of this type, however, is transmitted or processed, it generally undergoes a substantial amount of distortion in the form of rounding of the corners of the waveform and causing the pulse transitions to have a substantial slope; so that the resulting waveform generally resembles a sine wave in shape. Furthermore, the multilevel signal may undergo amplitude modulation in the transmission medium and may vary in signal strength in accordance with the distance that the receiver is located from the transmitting station, so that the peak-to-peak amplitude of the transmitted wave varies accordingly.

Reference to FIG. 2 of the drawing illustrates an ideal uniform square wave A of the type which may be produced at a transmitting station, with the waveform B indicating the distortion in the pulse transitions which can take place in the transmitting medium before the waveform B reaches the receiver utilization circuit. Similarly, waveform C of FIG. 2 illustrates a pulse-width modulated square wave signal of an ideal type, with waveform D corresponding to that same signal after distortion in a transmission medium.

For the purposes of illustration, assume that the distorted waveform D is applied to an input terminal 15 of the signal reconstruction circuit shown in FIG. 1. This waveform may be received by any suitable receiving apparatus and is indicated in FIG. 1 as being further modified as an amplitude-modulated waveform 17, with the amplitude modulation being highly exaggerated for purposes of illustration. This amplitude modulation may be the result of a number of causes, such as fading or differences in signal strength, for example, and varies at a much slower rate than the cyclic variations of the pulse-width modulated signal as illustrated by the waveform 17.

The signal 17 is applied through an amplifier 16 to a DC restoring circuit 19, which modifies the signal to appear as the signal 20. This restoration of the DC level is necessary in order to present the signal in proper form for regeneration by the signal reconstruction circuit 22, which is in the form of a dual-cascaded differential amplifier, operating to regenerate the original pulse train.

The signal 20 is applied through an NPN emitter-follower transistor 24 to the base of an NPN transistor 26 forming one-half of an input differential amplifier along with a second NPN transistor 27. The emitters of the transistors 26 and 27 are coupled together to a constant current source provided by an NPN transistor 29, the operating level of which is obtained from a voltage divider 30 connected between the source of B+ and ground potential.

In order to provide a reference voltage for establishing the switching level of the differential amplifier 26, 27, the signal 20 also is applied to the base of the further NPN emitter follower transistor 31, the emitter of which is coupled to a peak detecting circuit 32, including a storage capacitor 33, a potentiometer 34 and a resistor 35. The time constants of the peak detecting circuit 33 are chosen to provide an amplitude modulated direct current (D C reference voltage, the magnitude of which varies in accordance with the variations of signal strength of the signal 20 obtained from the output of the amplifier 16. A portion of this amplitude modulated reference voltage is applied to the base of the transistor 27 from the tap of the potentiometer 34 and operates to establish the reference level for controlling the switching level of the differential amplifier 26, 27.

The transistors 24 and 26 and the transistors 31 and 27 form two Darlington pairs, with the emitters of the output transistors 26 and 27 being coupled to the current source transistor 29 to form the differential amplifier configuration described. In addition, however, by connecting the capacitor 32, potentiometer 34 and resistor 35 to the emitter of the transistor 31, the rectifying action of the transistor 31 is utilized as part of the peak detection circuit, eliminating the need for an additional diode in the peak detecting circuit 32. Then, by adjusting the tap on the potentiometer 34, the switching level of the differential amplifier can be varied, with the same input signal applied to both sides or inputs of the Darlington differential amplifier circuit at the bases of the transistors 24 and 31.

It is apparent that when the instantaneous amplitude of the input signal 20 is greater than the varying DC reference voltage applied to the base of the transistor 27, the transistor 26 is rendered conductive and vice versa. By adjusting the tap of the potentiometer 34, the slicing or switching level of the differential amplifier with respect to the signal 20 may be varied to reconstruct the signal 20 into a rectangular-wave of current and no-current intervals.

Since relatively large voltage swings (of the order of 4 to 5 volts peak-to-peak) are utilized to drive the input differential amplifier 26, 27, the slope of the reconstructed signal at the collectors of the transistors 26 and 27 is quite steep. However, in order to sharpen the slope of the signal obtained from the collectors of the transistors 26 and 27 even more, the collectors of these transistors are cascaded through a pair of NPN emitter follower transistors 36 and 37, respectively, to the bases of an additional pair of PNP transistors 38 and 39, connected as a second or output differential amplifier. The emitters of the transistors 38 and 39 are supplied from a constant current source in the form of a PNP transistor 40.

Since the transistors 26, 27, 36, 37, 38, and 39 are all differentially connected in cascade, the tracking of the cascaded stages of the reconstruction circuit 22 is accurate with respect to the input signal obtained from the DC restoration circuit 19. Thus, if a pulse-width modulated waveform of the type shown in waveform D of FIG. 2 is applied to the input terminal 15, it may be substantially reconstructed as shown in waveforms E and F, corresponding to the outputs at the collectors of the transistors 38 and 39, respectively. This is true even though substantial distortion of the original waveform takes place as shown in waveform D and even though amplitude modulation of the type illustrated in the waveforms 17 and 20 of FIG. 1 also occurs in addition to the distortion shown in waveform D. The outputs E and F obtained from the collectors of the transistors 38 and 39 then may be utilized by any suitable signal processing circuitry for decoding or processing the reconstructed waveform, which is a substantial duplication of the original waveform C to be recovered by the circuit.

Although in the circuit of the foregoing description, a peak detector 32 is used to establish the reference voltage for the switching level of the differential amplifier circuit, it should be apparent that the operation of the circuit is not limited to a peak detector circuit for establishing this reference level; but that an average detector or the like could also be used to produce similar results.

In addition, although the circuit has been described as reconstructing a rectangular-wave signal train, the circuit could be utilized to provide an output pulse in response to the attainment of a particular level by a complex analog signal or multilevel signal. For example, the circuit could be utilized as a sync separator circuit for a television receiver, with the input signal being the composite analog television signal. The reference or switching level of the circuit could be adjusted to provide an output pulse only in response to the synchronizing signal peaks of the complex input signal. The operation of the circuit, however, would be the same as that previously described for reconstructing a rectangular signal, and the same circuit configuration would be employed. Thus, the switching level could be established at a point corresponding to a predetermined fraction of the signal peaks and would not be an absolute value.

I claim:

1. A circuit for constructing a rectangular signal from an input signal including in combination:

differential amplifier means having first and second inputs and at least one output;

means for applying the input signal to the first input of the differential amplifier means;

a signal level detector having an input and an output and providing a varying direct current reference voltage on the output thereof proportional to the level of signals applied to the input thereof;

means for applying the input signal to the input of the signal level detector;

means coupled with the output of the signal level detector for supplying a predetermined portion of the reference voltage to the second input of the differential amplifier means for establishing a varying switching level for the differential amplifier means, the output of the differential amplifier means providing said constructed rectangular signal.

2. The combination according to claim 1 wherein the input signal is subject to variation in amplitude peaks, and wherein the signal level detector is a peak detector which provides an amplitude modulated reference voltage so that such variations in the incoming signal have substantially no affect on the constructed signal.

3. The combination according to claim 1 wherein the differential amplifier means includes a first transistor differential amplifier comprising first and second transistors, each having collector, base and emitter electrodes, with the emitter electrodes being connected in common, a constant current source coupled with the emitter electrodes of the first and second transistors; the base electrode of the first transistor corresponding to the first input and the base electrode of the second transistor corresponding to the second input, and third and fourth transistors having collector, base and emitter electrodes, the collector electrodes of the first and second transistors being connected, respectively, to the base electrodes of the third and fourth transistors, the combination further including a second differential amplifier comprising fifth and sixth transistors, each having collector, base and emitter electrodes, a second constant current source coupled with the emitter electrodes of the fifth and sixth transistors, the base electrodes of the fifth and sixth transistors being connected, respectively, with the emitter electrodes of the third and fourth transistors, and the collector electrode of at least one of the fifth and sixth transistors providing said rectangular signal.

4. The combination according to claim 3 wherein the input signal is subject to amplitude modulation variations so that the reference voltage formed by the signal level detector varies in accordance with said amplitude modulation variations of the input signal, causing the switching level for the first differential amplifier to vary in accordance with the amplitude modulations to maintain a predetermined ratio of the switching level with respect to the peak-to-peak swings of the input signal.

5. A switching circuit for providing an output in response to input signals having an amplitude in excess of a threshold level including in combination:

first and second transistors, each having collector, base and emitter electrodes and cascaded in a Darlington configuration, with the emitter electrode of the first transistor being coupled with the base electrode of the second transistor;

third and fourth transistors, each having collector, base and emitter electrodes;

a current source coupled with the emitter electrodes of the second and fourth transistors to form a differential amplifier circuit configuration;

a signal level detector coupled with the emitter electrode of the third transistor to form a varying direct current reference voltage proportional to the level of the signals appearing on the emitter of the third transistor;

means for coupling a predetermined portion of the reference voltage to the base of the fourth transistor to establish said threshold level; and means for applying the same input signals to the bases of the first and third transistors.

6. The combination according to claim 5 wherein the input signals have varying amplitudes and the signal level detector includes capacitance means, coupled between the emitter of the third transistor and a point of reference potential, and impedance means coupled in parallel therewith between the emitter of the third transistor and the point of reference potential; the base of the fourth transistor is coupled with the impedance means; the capacitance means and the impedance means form a peak detecting circuit in conjunction with the third transistor; and the threshold level is established by the point of connection of the base of the fourth transistor with the impedance means.

7. The combination according to claim 6 wherein the impedance means includes a potentiometer, the tap of which is coupled with the base of the fourth transistor to establish a reference threshold voltage for the differential amplifier circuit which is a predetermined amount of the detected peaks of the input signal and varies in accordance with amplitude modulation of said input signal to maintain the switching level of the differential circuit at a predetermined ratio of the peak-to-peak swings of the input signals.

* * * * *